3,003,010
PROCESS FOR THE PREPARATION OF PRECIPITATED CALCIUM CARBONATES

Fernand Meuret, Heusden, and Victor Brouwers, Malines, Belgium, assignors to Solvay & Cie, Brussels, Belgium, a Belgian company
No Drawing. Filed Mar. 17, 1958, Ser. No. 721,671
Claims priority, application Belgium Mar. 26, 1957
5 Claims. (Cl. 260—762)

The present invention concerns a process for the preparation of extremely fine grained precipitated calcium carbonate particularly suitable as a white reinforcing filler, especially for rubber, natural or synthetic, and as a pigment for the preparation of paper coatings.

It is known that the crystalline form of precipitated calcium carbonate particularly suitable as a reinforcing filler for rubber is rhombohedral calcite with dimensions less than 0.1 micron.

It is likewise known that there are difficulties encountered in obtaining a precipitated calcium carbonate satisfying these conditions when the precipitate is prepared by carbonation of milk of lime.

The present invention concerns a process for the preparation of precipitated calcium carbonate satisfactory for use as a white filler, being present in the desired crystalline form and the dimensions of those particles being appreciably less than those of precipitated calcium carbonates for reinforcing actually on the market.

The applicants have found that it is extremely advantageous to prepare precipitated calcium carbonate by the carbonation of milk of lime in the presence of ions, such as those of aluminium, magnesium, vanadium, chromium or ferrous iron.

The process according to the invention for the preparation of precipitated calcium carbonate by carbonation of milk of lime is characterised in that it is effected in the presence of an amount of ions selected those of aluminium, magnesium, vanadium, chromium or ferrous iron, said amount being comprised between 0.2 and 3% by weight of the calcium carbonate precipitated and added at any moment of the preparation. The desired amount of ions may, for example, be added to the milk of lime before the carbonation or to the suspension at the end of the carbonation.

In the carrying out of the process according to the invention, it is suitable to add the above mentioned ions in the proportion of 0.2 to 3% by weight of the precipitated calcium carbonate. The following table shows by way of example, and without limiting the scope of the invention, the quantities of some of the ions successfully used.

| Salts: | Metal content in g./kgr. $CaCO_3$ precipitated |
|---|---|
| $Na_2Al_2O_4$ | 2.2 |
| $Al_2(SO_4)_3$ | 3.2 |
| $MgSO_4$ | 6 |
| $VOSO_4.2H_2O$ | 3.1 |
| $Cr(NO_3)_3.9H_2O$ | 3.4 |
| $FeCl_2.H_2O$ | 3.5 |

Among the above mentioned ions, those of aluminium or magnesium are preferably selected because the salts of these metals are in general of a white colour and particularly suitable in the preparation of white fillers.

By adding to rubber a calcium carbonate precipitated obtained according to the process of the invention, one obtains vulcanisates with mechanical characteristics superior to those of vulcanisates obtained by using a commercial precipitated calcium carbonate as reinforcing filler, as shown in the following examples.

Each vulcanisate is prepared in duplicate: In one a precipitated calcium carbonate is used, prepared by carbonation of milk of lime according to the current technique, and is designated by $CaCO_3$ (I); in the other a precipitated calcium carbonate is used which has been prepared under exactly the same conditions as $CaCO_3$ (I), but in the presence of an amount of aluminium ions of 3.2 g. per kilogram of precipitated calcium carbonate. This is designated by $CaCO_3$ (II).

Example 1

There was prepared (in duplicate) a vulcanisate of the following formula

| | G. |
|---|---|
| "Yellow Circle" rubber (medium vulcanization speed) | 100 |
| ZnO | 5 |
| Stearic acid | 2 |
| Sulphur | 3 |
| Phenyl-$\beta$-naphthylamine | 0.5 |
| Aldol-$\alpha$-naphthylamine | 0.5 |
| Dibenzothiazyl disulphide | 0.8 |
| Diphenylguanidine | 0.1 |
| Akticit A | 2.43 |
| $CaCO_3$ (I) or $CaCO_3$ (II) | 81 |

The following table shows the improvement in mechanical properties of the vulcanisates containing the precipitated calcium carbonate $CaCO_3$ (II) prepared according to the invention.

| Properties | $CaCO_3$ (I) | $CaCO_3$ (II) |
|---|---|---|
| Modulus 300%, kg./cm.$^2$ | 64 | 67 |
| Break strength, kg./cm.$^2$ | 279 | 290 |
| Elongation at break, percent | 585 | 610 |
| Tear resistance, kg./cm. | 64 | 102 |
| Shore hardness, $A_2$ | 57 | 54 |
| Abrasion (DIN), mm.$^3$ | 184 | 159 |

Example 2

There was prepared (in duplicate) a vulcanisate of the following formula

| | G. |
|---|---|
| "Yellow Circle" rubber (medium vulcanization speed) | 100 |
| ZnO | 5 |
| Stearic acid | 2 |
| Sulphur | 3 |
| Phenyl-$\beta$-naphthylamine | 0.5 |
| Aldol-$\alpha$-naphthylamine | 0.5 |
| Dibenzothiazyl disulphide | 0.8 |
| Diphenylguanidine | 0.3 |
| $CaCO_3$ (I) or $CaCO_3$ (II) | 81 |

The following table shows the improvement in mechanical properties of the vulcanisates containing the precipitated calcium carbonate $CaCO_3$ (II) prepared according to the invention.

| Properties | $CaCO_3$ (I) | $CaCO_3$ (II) |
|---|---|---|
| Modulus 300%, kg./cm.$^2$ | 36 | 60 |
| Break strength, kg./cm.$^2$ | 228 | 280 |
| Elongation at break, percent | 665 | 645 |
| Tear resistance, kg./cm. | 79 | 106 |
| Shore Hardness, $A_2$ | 42 | 53 |
| Abrasion (DIN), mm.$^3$ | 180 | 164 |

We claim:
1. A process for the preparation of precipitated calcium carbonate particularly suitable as a filler for natural and synthetic rubber and as a pigment for paper coatings which comprises the steps of preparing a milk of lime solution, adding to said milk of lime solution a soluble salt selected from the group consisting of sodium aluminate ($Na_2Al_2O_4$), aluminum sulphate ($Al_2(SO_4)_3$), magnesium sulphate ($MgSO_4$), vanadyl sulphate ($VOSO_4.2H_2O$)

chromium nitrate ($Cr(NO_3)_3.9H_2O$) and ferrous chloride ($FeCl_2.H_2O$), passing through said milk of lime a stream of carbon dioxide to effect carbonation thereof and to form calcium carbonate as a precipitate, whereby said calcium carbonate is in precipitated form in said aqueous milk of lime in the presence of said soluble salt, and filtering said solution to separate said calcium carbonate therefrom, said soluble salt being added in an amount such that the metal component of said salt represents 0.2 to 3% by weight of the precipitated calcium carbonate.

2. A process for the preparation of precipitated calcium carbonate particularly suitable as a filler for natural and synthetic rubber and as a pigment for paper coating which comprises the steps of preparing a milk of lime solution, passing through said milk of lime solution a stream of carbon dioxide to effect carbonation thereof and to form calcium carbonate as a precipitate, and adding to said solution at the end of the carbonation, a soluble salt selected from the group consisting of sodium aluminate ($Na_2Al_2O_4$), aluminum sulphate ($Al_2(SO_4)_3$), magnesium sulphate ($MgSO_4$), vanadyl sulphate ($VOSO_4.2H_2O$)

chromium nitrate ($Cr(NO_3)_3.9H_2O$) and ferrous chloride ($FeCl_2.H_2O$), said soluble salt being in an amount such that the metal component of said salt represents 0.2 to 3% by weight of the precipitated calcium carbonate, whereby said calcium carbonate is in precipitated form in said aqueous milk of lime in the presence of said metal component, and filtering said solution to separate said calcium carbonate therefrom.

3. A process for the preparation of precipitated calcium carbonate particularly suitable as a filler for natural and synthetic rubber and as a pigment for paper coating which comprises the steps of preparing a milk of lime solution, passing through said milk of lime solution a stream of carbon dioxide to effect carbonation thereof and to form calcium carbonate as a precipitate, and filtering said solution to separate said calcium carbonate therefrom, said solution having added to it at least prior to said filtering a soluble salt selected from the group consisting of sodium aluminate ($Na_2Al_2O_4$), aluminum sulphate ($Al_2(SO_4)_3$), magnesium sulphate ($MgSO_4$), vanadyl sulphate ($VOSO_4.2H_2O$), chromium nitrate ($Cr(NO_3)_3.9H_2O$) and ferrous chloride ($FeCl_2.H_2O$), said soluble salt being in an amount such that the metal component of said salt represents 0.2 to 3% by weight of the precipitated calcium carbonate, whereby said calcium carbonate is in precipitated form in said aqueous milk of lime in the presence of said metal component.

4. A vulcanizate of an elastomer selected from the group consisting of natural rubber and synthetic rubber containing white filler consisting essentially of precipitated calcium carbonate, said calcium carbonate being produced by the steps of preparing a milk of lime solution, passing through said milk of lime solution a stream of carbon dioxide to effect carbonation thereof and to form calcium carbonate as a precipitate, and filtering said solution to separate said calcium carbonate therefrom, said solution having added to it at least prior to said filtering a soluble salt selected from the group consisting of sodium aluminate ($Na_2Al_2O_4$), aluminum sulphate ($Al_2(SO_4)_3$), magnesium sulphate ($MgSO_4$), vanadyl sulphate ($VOSO_4.2H_2O$)

chromium nitrate ($Cr(NO_3)_3.9H_2O$) and ferrous chloride ($FeCl_2.H_2O$), said soluble salt being in an amount such that the metal component of said salt represents 0.2 to 3% by weight of the precipitated calcium carbonate, whereby said calcium carbonate is in precipitated form in said aqueous milk of lime in the presence of said metal component.

5. The vulcanizate defined in claim 4, wherein said calcium carbonate has a particle size of less than 0.1 micron.

References Cited in the file of this patent

UNITED STATES PATENTS

| | | |
|---|---|---|
| 1,595,416 | Rafsky | Aug. 10, 1926 |
| 1,994,271 | Church et al. | Mar. 12, 1935 |
| 2,068,039 | Rafton | Jan. 19, 1937 |
| 2,242,228 | Bradner | May 20, 1941 |
| 2,287,440 | McCleary | June 23, 1942 |
| 2,520,850 | Minnick | Aug. 29, 1950 |
| 2,636,830 | Wall | Apr. 28, 1953 |
| 2,700,655 | Endres | Jan. 25, 1955 |